United States Patent
Park et al.

(10) Patent No.: US 10,897,720 B2
(45) Date of Patent: Jan. 19, 2021

(54) METHOD AND APPARATUS FOR TRANSMITTING AND RECEIVING DOWNLINK PRE-EMPTION INDICATION DATA IN NEXT GENERATION WIRELESS NETWORK

(71) Applicant: KT CORPORATION, Gyeonggi-do (KR)

(72) Inventors: Kyujin Park, Seoul (KR); Woo-Jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/349,347

(22) PCT Filed: Nov. 15, 2017

(86) PCT No.: PCT/KR2017/012910
§ 371 (c)(1),
(2) Date: May 13, 2019

(87) PCT Pub. No.: WO2018/093126
PCT Pub. Date: May 24, 2018

(65) Prior Publication Data
US 2019/0349795 A1    Nov. 14, 2019

(30) Foreign Application Priority Data

Nov. 16, 2016  (KR) .................. 10-2016-0152845
Nov. 13, 2017  (KR) .................. 10-2017-0150595

(51) Int. Cl.
*H04W 24/08*    (2009.01)
*H04W 84/04*    (2009.01)
*H04W 88/02*    (2009.01)

(52) U.S. Cl.
CPC .......... *H04W 24/08* (2013.01); *H04W 84/042* (2013.01); *H04W 88/02* (2013.01)

(58) Field of Classification Search
None
See application file for complete search history.

(56) References Cited

U.S. PATENT DOCUMENTS

2006/0007880 A1    1/2006 Terry
2007/0265001 A1*  11/2007 Dias .................. H04W 36/0083
                                                      455/435.1

(Continued)

OTHER PUBLICATIONS

Intel Corporation, "Downlink URLLC transmission and multiplexing with eMBB", R1-1612003, 3GPP TSG RAN WG1 Meeting #87, Reno, USA, Nov. 14-18, 2016, pp. 1-9.
Interdigital Communications, "On multiplexing of eMBB and URLLC data", R1-1612646, 3GPP TSG RAN WG1 Meeting #87, Reno, USA Nov. 14-18, 2016.

(Continued)

*Primary Examiner* — Diane L Lo
(74) *Attorney, Agent, or Firm* — IP Legal Services, LLC (57) ABSTRACT

Provided is a method for transmitting and receiving downlink pre-emption indication data in a next generation/5G wireless access network. The method for a terminal for receiving downlink pre-emption indication data may include: receiving monitoring configuration data for downlink pre-emption indication data from a base station; and, on the basis of the monitoring configuration data, monitoring the downlink pre-emption indication data, wherein the monitoring configuration data comprises data for whether to monitor the downlink pre-emption indication data.

9 Claims, 6 Drawing Sheets

(56) References Cited

U.S. PATENT DOCUMENTS

| | | |
|---|---|---|
| 2008/0068979 A1 | 3/2008 | Visotsky et al. |
| 2010/0208689 A1 | 8/2010 | Terry |
| 2013/0272243 A1 | 10/2013 | Terry |
| 2016/0037517 A1 | 2/2016 | Terry |
| 2016/0113008 A1 | 4/2016 | Damnjanovic et al. |
| 2016/0134405 A1* | 5/2016 | Luo .................. H04L 1/007 370/328 |
| 2016/0218849 A1 | 7/2016 | Bertrand et al. |
| 2018/0035332 A1* | 2/2018 | Agiwal ............ H04W 74/0858 |
| 2018/0063865 A1* | 3/2018 | Islam .................... H04L 5/0087 |
| 2019/0090239 A1 | 3/2019 | Damnjanovic et al. |
| 2019/0281622 A1* | 9/2019 | Hwang ................. H04W 52/58 |

OTHER PUBLICATIONS

CATT, "NR frame structure for multiplexing of URLLC and eMBB traffic", R1-1611367, 3GPP TSG RAN WG1 Meeting #87, Reno, NV, USA, Nov. 14-18, 2016, pp. 1-4.

ETRI, "Multiplexing of eMBB and URLLC transmissions", R1-1609392, 3GPP TSG RAN WG1 Meeting #86bis, Lisbon, Portugal, Oct. 10-14, 2016, pp. 1-3.

CATT, "NR frame structure for multiplexing of URLLC and eMBB traffic", R1-1608764, 3GPP TSG RAN WG1 #86bis, Lisbon, Portugal, Oct. 10-14, 2016, pp. 1-3.

NEC, "Discussion on DL preemption indication", R1-1718013, 3GPP TSG RAN WG1 Meeting 90bis, Prague, CZ, Oct. 9-13, 2017, pp. 1-4.

KT Corp., "Remaining details on preemption indication", R1-1720967, 3GPP TSG RAN WG1 Meeting 91, Reno, USA, Nov. 27-Dec. 1, 2017.

* cited by examiner

METHOD AND APPARATUS FOR TRANSMITTING AND RECEIVING DOWNLINK PRE-EMPTION INDICATION DATA IN NEXT GENERATION WIRELESS NETWORK

CROSS REFERENCE TO RELATED APPLICATIONS

This application is a National Stage Patent Application of PCT International Patent Application No. PCT/KR2017/012910 (filed on Nov. 15, 2017) under 35 U.S.C. § 371, which claims priority to Korean Patent Application Nos. 10-2016-0152845 (filed on Nov. 16, 2016) and 10-2017-0150595 (filed on Nov. 13, 2017), the teachings of which are incorporated herein in their entireties by reference.

TECHNICAL FIELD

The present disclosure relates to methods for transmitting/receiving downlink preemption indication information in a next-generation/5G radio access network (hereinafter, referred to as "new radio" or "NR") that is under discussion in the 3rd generation partnership project (3GPP).

BACKGROUND ART

Recently, the 3GPP has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra-reliable and low latency communication (URLLC) are proposed as representative usage scenarios of the NR. In order to meet the requirements of the individual scenarios, it is required to design the NR to have flexible frame structures, compared with the LTE/LTE-Advanced.

In particular, in the NR, the longer the time-domain resource allocation, the more efficient, some services such as the eMBB and the mMTC are in view of cell throughput and coverage. On the contrary, in case of the URLLC, the shorter the time-domain resource allocation, the more efficient some services are due to a latency issue. Accordingly, it is necessary to effectively support multiplexing for data traffic between services in a network configured to provide the eMBB service, the mMTC service and the URLLC service together.

DETAILED DESCRIPTION OF THE INVENTION

Technical Problem

In accordance with embodiments of the present disclosure, methods are provided for supporting effective multiplexing for data traffic between services in a network configured to provide the eMBB service, the mMTC service and the URLLC service together.

Technical Solution

In accordance with an aspect of the present disclosure to address the above issue, a method of a user equipment is provided for receiving downlink preemption indication information. The method includes: receiving monitoring configuration information on the downlink preemption indication information from a base station; and monitoring the downlink preemption indication information based on the monitoring configuration information. The monitoring configuration information includes information on whether to monitor the downlink preemption indication information.

In accordance with another aspect of the present disclosure, a method of a base station is provided for transmitting downlink preemption indication information. The method includes: configuring monitoring configuration information on the downlink preemption indication information; transmitting the monitoring configuration information to a user equipment; and, when downlink preemption occurs, transmitting the downlink preemption indication information to the user equipment. The monitoring configuration information includes information on whether to monitor the downlink preemption indication information.

In accordance with still another aspect of the present disclosure, a user equipment is provided for receiving downlink preemption indication information. The user equipment includes: a receiver receiving monitoring configuration information on the downlink preemption indication information from a base station; and a controller monitoring the downlink preemption indication information based on the monitoring configuration information. The monitoring configuration information includes information on whether to monitor the downlink preemption indication information.

In accordance with yet another aspect of the present disclosure, a base station is provided for transmitting downlink preemption indication information. The base station includes: a controller configuring monitoring configuration information on the downlink preemption indication information; and a transmitter transmitting the monitoring configuration information to a user equipment, and when downlink preemption occurs, transmitting the downlink preemption indication information to the user equipment. The monitoring configuration information includes information on whether to monitor the downlink preemption indication information.

Effects of the Invention

In accordance with embodiments of the present disclosure, in the NR, effective multiplexing is supported for data traffic between services in a network configured to provide the eMBB service, the mMTC service and the URLLC service together.

BEST MODE FOR CARRYING OUT THE INVENTION

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, a wireless communication system refers to a system for providing various communication services such as a voice communication service, a packet data service, etc. The wireless communication system includes user equipment (UE) and a base station (BS).

The UE is a generic term referring to devices used in wireless communication. For example, the UE may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally refers to a station communicating with the UE. The base station or the cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of the various cells is controlled by a base station. Therefore, the base station may be classified into two categories. 1) The base station may be referred to an apparatus that forms a corresponding communication service area and provides a communication service within the corresponding communication service area, such as a megacell, a macrocell, a microcell, a picocell, a femtocell, and a small cell, or 2) the base station may be referred to a communication service area. In the case of 1), the base station may be referred to i) apparatuses that are controlled by the same entity for forming and providing the corresponding communication service area and, or ii) apparatus that interact and cooperate with each other for forming and providing the corresponding communication service area. According to communication schemes employed by a base station, the base station may be referred to as a point, a transmission/reception point, a transmission point, a reception point, or the like. In case of 2), the base station may be a communication service area itself where UEs able to receive signals from or transmit signals to other UEs and neighboring base stations.

In the present disclosure, the cell may also refer to a coverage of a signal transmitted from a transmission/reception point, a component carrier having the coverage of a signal transmitted from a transmission point or a transmission/reception point, or a transmission/reception point itself.

The UE and the base station are two entities for performing transmission/reception used to embody the technology and technical spirit described in the present specification. The UE and the base station are a generic term and not limited to specific terms or words.

Herein, the uplink (hereinafter, referred to as "UL") refers to data transmission/reception by a UE to/from a base station, and the downlink (hereinafter, referred to as "DL") refers to data transmission/reception by a base station to/from a UE.

UL transmission and DL transmission may be performed by employing i) a time division duplex (TDD) technique performing transmission through different time slots, ii) a frequency division duplex (FDD) technique performing transmission through different frequencies, or iii) a hybrid technique of the frequency division duplex (FDD) and the time division duplex (TDD).

Further, the related standard of the wireless communication system defines configuring the UL and the DL based on a single carrier or a pair of carriers.

The UL and the DL transmit control information through one or more control channels, such as a physical DL control channel (PDCCH), a physical UL control channel (PUCCH), and the like. The UL and DL transmit data through data channels, such as a physical DL shared channel (PDSCH), a physical UL shared channel (PUSCH), and the like.

The DL may denote communication or a communication path from multiple transmission/reception points to a UE, and the UL may denote communication or a communication path from the UE to the multiple transmission/reception points. In the DL, a transmitter may be a part of multiple transmission/reception points, and a receiver may be a part of a UE. In the UL, a transmitter may be a part of a UE and a receiver may be a part of multiple transmission/reception points.

Hereinafter, transmission and reception of a signal through a channel such as the PUCCH, the PUSCH, the PDCCH, or the PDSCH, may be described as the transmission and reception of the PUCCH, the PUSCH, the PDCCH, or the PDSCH.

Meanwhile, higher layer signaling includes radio resource control (RRC) signaling transmitting RRC information containing an RRC parameter.

The base station performs DL transmission to UEs. The base station may transmit a physical DL control channel for transmitting i) DL control information, such as scheduling required to receive a DL data channel that is a primary physical channel for unicast transmission, and ii) scheduling approval information for transmission through an UL data channel. Hereinafter, transmitting/receiving a signal through each channel may be described in such a manner that a corresponding channel is transmitted/received.

Any of multiple access techniques may be applied to the wireless communication system, and therefore no limitation is imposed on them. For example, the wireless communication system may employ various multiple access techniques, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments of the present disclosure may be applied to resource allocation in i) asynchronous wireless communication evolving into LTE/LTE-advanced and IMT-2020 from GSM, WCDMA, and HSPA, or ii) synchronous wireless communication evolving into CDMA, CDMA-2000, and UMB.

In the present disclosure, a machine type communication (MTC) terminal may refer to a terminal supporting low costs (or low complexity), a terminal supporting coverage enhancement, or the like. As another example, the MTC terminal may refer to a terminal defined as a predetermined category for supporting low cost (or low complexity) and/or coverage enhancement.

In other words, the MTC terminal may refer to a low cost (or low complexity) user equipment category/type newly defined in 3GPP Release-13 and performing LTE-based MTC-related operations. The MTC device of the present disclosure may refer to a device category/type that is defined in or before 3GPP Release-12 that supports enhanced coverage in comparison with the existing LTE coverage or supports low power consumption, or may refer to a low cost (or low complexity) device category/type newly defined in Release-13. The MTC terminal may refer to a further enhanced MTC terminal defined in Release-14.

In the present disclosure, a narrowband Internet of Things (NB-IoT) terminal refers to a terminal supporting radio access for cellular IoT. NB-IoT technology aims to improve an indoor coverage, to support large-scale low-speed terminals, to reduce latency sensitivity, to lower terminal costs, to reduce power consumption, and to optimize an network architecture.

An enhanced mobile broadband (eMBB), massive machine-type communication (mMTC), and ultra-reliable and low latency communication (URLLC) are proposed as representative usage scenarios for NR having been discussed in the 3GPP recently.

In the present disclosure, a frequency, a frame, a subframe, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

NR (New Radio)

Recently, the 3GPP has approved the "Study on New Radio Access Technology", which is a study item for research on next-generation/5G radio access technology. On the basis of the Study on New Radio Access Technology, discussions have been in progress for frame structures, channel coding and modulation, waveforms, multiple access methods, and the like for the new radio (NR).

The NR is required to be designed not only to provide an improved data transmission rate as compared with the long term evolution (LTE)/LTE-Advanced, but also to meet various requirements per detailed and specific usage scenario. An enhanced mobile broadband (eMBB), massive machine-type communication (mMTC), and ultra-reliable and low latency communication (URLLC) are proposed as representative usage scenarios of the NR. In order to meet the requirements per usage scenario, it is required to design the NR to have flexible frame structures, compared with the LTE/LTE-Advanced.

Specifically, the eMBB, mMTC, URLLC are considered as representative usage scenarios of the NR by the 3GPP. Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios through a frequency band provided to an arbitrary NR system.

To this end, there have been discussions on i) methods of multiplexing numerologies having subcarrier spacing (SCS) values different from one another based on TDM, FDM or TDM/FDM through one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms. Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as $y=14$ regardless of the numerology.

Therefore, a slot may be composed of 14 symbols. In accordance with a transmission direction for a corresponding slot, all symbols may be used for DL transmission or UL transmission, or the symbols may be used in the configuration of a DL portion+a gap+a UL portion.

Further, a minislot composed of fewer symbols than the slot has been defined in a numerology (or SCS), and as a result, a short time domain scheduling interval may be configured for UL/DL data transmission or reception based on the minislot. Also, a long time domain scheduling interval may be configured for the UL/DL data transmission or reception by slot aggregation.

Particularly, in the case of the URLLC for transmission or reception of latency critical data, when scheduling is performed on a per-slot basis based on 0.5 ms (7 symbols) or 1 ms (14 symbols) defined in a frame structure based on a numerology having a small SCS value, for example, 15 kHz, it is difficult to satisfy latency requirements. To this end, a mini-slot made up of fewer OFDM symbols than the slot may be defined. Thus the scheduling for the UPLLC for transmitting and receiving the latency critical data may be performed based on the mini-slot.

Figure 1:
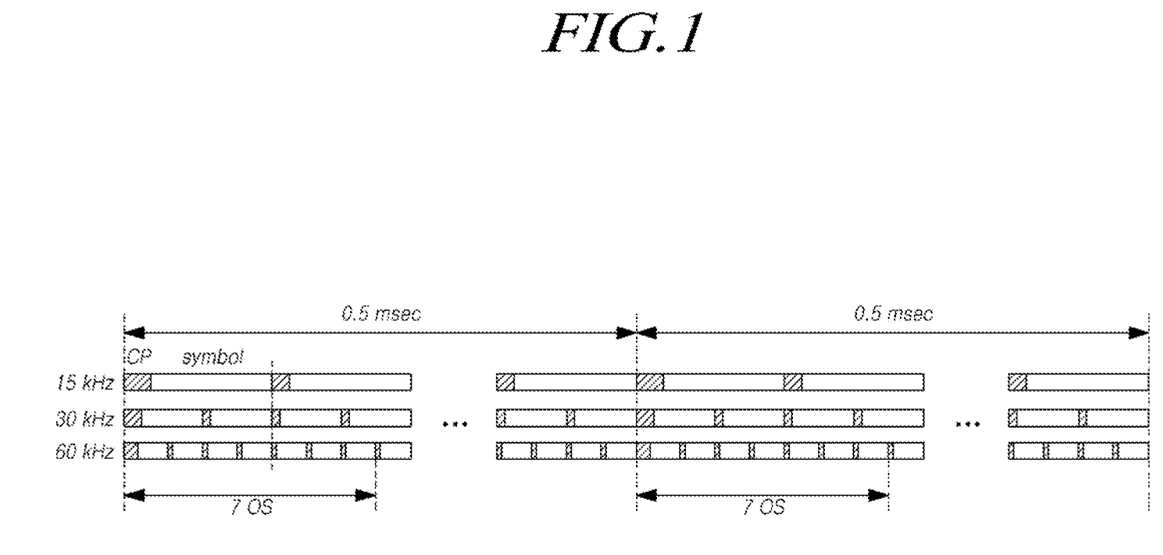
FIG. 1 is a diagram illustrating arrangements of orthogonal frequency division multiple (OFDM) symbols in case subcarrier spacings each different from another are used, according to embodiments of the present disclosure.

Further, methods have been discussed for scheduling data according to latency requirements based on a slot (or a minislot) length defined for each numerology, by multiplexing numerologies having different SCS values from one another in one NR carrier, using the TDM or FDM technique, as described above. For example, since the length of a symbol for the SCS of 60 kHz as shown in FIG. 1 is shortened by about a fourth of that for the SCS of 15 kHz, when one slot is made up of seven OFDM symbols in both the cases, the length of the slot based on the SCS of 15 kHz is 0.5 ms, whereas the length of the slot based on the SCS of 60 kHz is shortened to about 0.125 ms.

As described above, discussions have been conducted for methods of satisfying each requirement of URLLC and eMBB by defining different SCSs or different TTI lengths in the NR.

As described above, in the NR, as methods for satisfying various usage scenarios, there have been discussions for supporting scheduling units each having different lengths from the other in the time-domain. In particular, in order to satisfy requirements of the URLLC service, it is necessary to subdivide the scheduling unit in the time-domain. However, from an eMBB perspective, the divided time-domain scheduling unit incurs excessive control overhead, and therefore it is undesirable in terms of cell throughput. Furthermore, from an mMTC perspective, a slightly longer time interval resource allocation structure may be more appropriate for coverage enhancement.

In accordance with embodiments of the present disclosure, methods are provided for supporting effective multiplexing between data traffics for each service in a network configured to simultaneously provide i) the eMBB and the mMTC which long time-domain resource allocation is more effective and ii) the URLLC which short time-domain resource allocation is required.

Embodiments described below may be applied to all UEs, base stations, and core network entities (MME) using mobile communication technologies. For example, embodiments of the present disclosure may be applied not only to mobile communication UEs employing long term evolution technology, but also to next generation mobile communication (5G mobile communication, New-RAT) UEs, base stations, and access and mobility functions (AMF). For convenience of description, a base station may denote an eNB of LTE/E-UTRAN, or denote at least one of a central unit (CU), a distribute unit (DU), and an object in which the CU and the DU are implemented as one logical object, or a gNB, in a 5G radio network in which the CU is separated from the DU.

The URLLC of the usage scenarios in the NR denote a service supporting high reliability and low latency. The URLLC is a service that causes a serious problem when a delay occurs in transmission/reception of data although the size of data is not large. For example, the URLLC may be used in an autonomous vehicle. That is, in such an autonomous vehicle case, the delay in data transmission/reception may cause traffic accident that damage human/material.

The eMBB is used for a service of supporting data transmission at high speed. The eMBB is a service used to transmit and receive a large amount of data. For example, the eMBB service may be used for a 3D video service, a UHD service, or the like, which are required to transmit and receive a large amount of data.

The mMTC is a service required transmitting and receiving a not a large size of data frequently and regularly and low power consumption. For example, the mMTC service may be used for sensors installed for Smart City deployment, which require to be operated for a long time with a mounted battery In a general case, one of the URLLC service, the eMBB service, and the mMTC service may be used depending on characteristics of a UE. Hereinafter, a UE using the URLLC service may be referred to as a URLLC UE, and UEs using the eMBB service and the mMTC service may be referred to as an eMBB UE and an mMTC UE, respectively. In addition, the eMBB, the mMTC, and the URLLC may also be interpreted as the eMBB UE, the mMTC UE, the URLLC UE.

The term "preemption" in the present disclosure may denote allocating, to the URLLC, a part of resources already allocated to the eMBB or the mMTC for satisfying latency requirement of URLLC when traffic for the URLLC occurs. At this time, since the URLLC uses one or more resources originally allocated to the eMBB or the mMTC, it is necessary to inform the eMBB UE or the mMTC UE that the one or more allocated resources are is preempted. DL preemption means that preemption for a DL resource of a UE.

In addition, DL preemption indication information denotes information for providing DL preemption to the UE as information for indicating which data channel is preempted in DL to a UE. In other words, the DL preemption indication information may be expressed as DL preemption notification information. The DL preemption indication information may be indicated in a signal type or a channel type.

Figure 3:
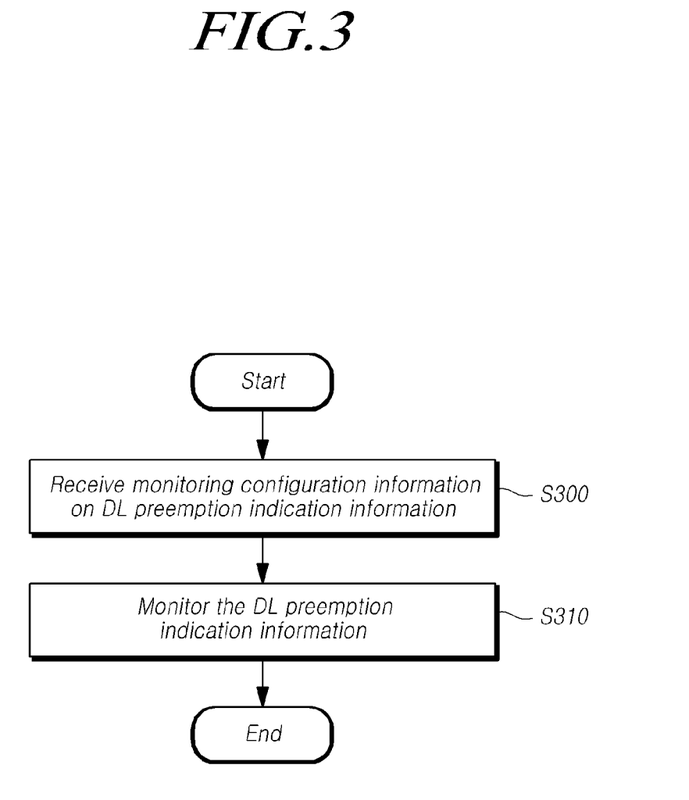
FIG. 3 is a flowchart illustrating a procedure of a user equipment for receiving the downlink preemption indication information, according to embodiments of the present disclosure.

FIG. 3 is a flowchart illustrating a procedure of a UE for receiving the DL preemption indication information, according to embodiments of the present disclosure.

Referring to FIG. 3, the UE may receive monitoring configuration information on DL preemption indication information from a base station at step S300. At this time, the monitoring configuration information may include information on whether to monitor the DL preemption indication information.

That is, the monitoring configuration information may include information on whether or not the UE will monitor the DL preemption indication information used for indicating whether DL is preempted. For example, an eMBB UE needs to monitor the DL premtion indication information because a resource originally allocated to itself may be preempted by an URLLC UE. However, a URLLC UE does need to monitor the DL preemption indication information because a resource originally allocated to the UPLLC UE is not preempted by another UE.

The monitoring configuration information may include information on a multiplexing mode. The multiplexing mode include i) a semi-static multiplexing mode for semi-statically allocating time/frequency resources (or areas) for each of the eMBB service, the URLLC service and the mMTC service and ii) a dynamic multiplexing mode for dynamically puncturing and using resources for enabling the URLLC to receive urgent data. The monitoring configuration information may include information for indicating which of the semi-static multiplexing mode and the dynamic multiplexing mode is used. For another example, the monitoring configuration information may include information for representing whether the dynamic multiplexing mode is supported.

Further, the monitoring configuration information may include threshold time-domain scheduling interval information for determining whether to monitor the DL preemption indication information. The UE may compare an time-domain scheduling interval allocated to itself with the threshold time-domain scheduling interval information in order to determine whether to perform the monitoring. For example, when a time-domain scheduling interval exceeding a threshold time-domain scheduling interval is allocated, the eMBB UE may determine that it is necessary to monitor the DL preemption indication information. On the other hand, when a time-domain scheduling interval less than a threshold time-domain scheduling interval is allocated, URLLC UE may determine that it is unnecessary to monitor the DL preemption indication information.

Further the monitoring configuration information may include information on whether a notification for a resource on which DL preemption occurs is indicated before the DL preemption or after the DL preemption when the dynamic multiplexing mode is applied. That is, this is information for determining when puncturing information for resources which are preempted for URLLC traffic will be notified to the UE, in other words, referred to as a puncturing notification mechanism.

Such monitoring configuration information may be indicated to the UE through cell-specific or UE-specific RRC signaling. At this time, even when the UE receives the monitoring configuration information through the cell-specific RRC signaling, corresponding monitoring operation of the UE may differ depending on capabilities of the UE.

Further, the UE may monitor the DL preemption indication information based on the received monitoring configuration information at step S310.

The DL preemption indication information may be indicated through group-common DCI. The group-common DCI may be transmitted to the UE through a DL control channel (PDCCH). Further, group-common DCI indicating slot format related information (SFI) and group-common DCI indicating the DL preemption indication information are separated from each other and then transmitted individually.

The DL preemption indication information may be indicated to the UE before DL preemption occurs. This scenario may be referred to as a pre-notification. In this case, the UE monitors DL preemption indication information while DL data is received.

The DL preemption indication information may be indicated to the UE after DL preemption has occurred. This scenario may be referred to as a post-notification. In this case, the UE does not monitor DL preemption indication information while DL data is received.

Figure 4:
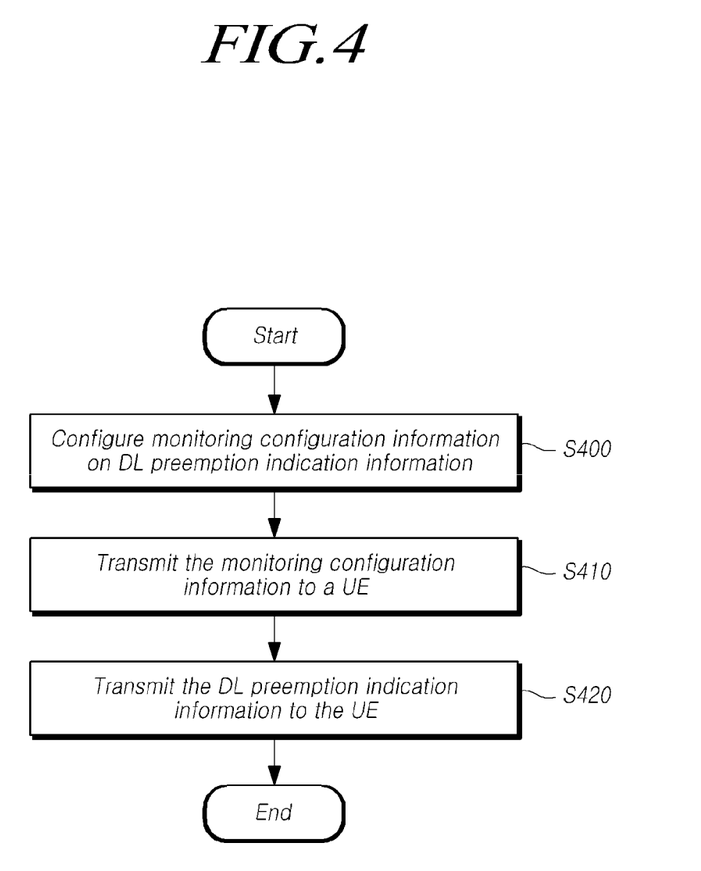
FIG. 4 is a flowchart illustrating a procedure of a base station for transmitting the downlink preemption indication information, according to embodiments of the present disclosure.

FIG. 4 is a flowchart illustrating a procedure of a base station for transmitting the DL preemption indication information, according to embodiments of the present disclosure.

Referring to FIG. 4, the base station may configure or generate monitoring configuration information on DL preemption indication information at step S400. At this time, as described above, the monitoring configuration information may include information on whether to monitor the DL preemption indication information.

That is, the monitoring configuration information may include information on whether or not the UE will monitor the DL preemption indication information used for indicating whether DL is preempted. For example, an eMBB UE needs to monitor the DL preemption indication information since a resource originally allocated to the eMBB may be preempted by an URLLC UE. However, the URLLC UE does not need to monitor the DL preemption indication information since there is no possibility that a resource originally allocated to the URLLC UE is preempted by another UE.

The monitoring configuration information may include information on a multiplexing mode. The multiplexing mode include a semi-static multiplexing mode for semi-statically allocating time/frequency resources (or areas) for each of the eMBB service, the URLLC service and the mMTC service, and a dynamic multiplexing mode for dynamically puncturing and using resources for enabling the URLLC to receive urgent data. The monitoring configuration information may include information for indicating which of the semi-static multiplexing mode and the dynamic multiplexing mode is used. For another example, the monitoring configuration information may include information for representing whether the dynamic multiplexing mode is supported.

Further, the monitoring configuration information may include threshold time-domain scheduling interval information for determining whether the monitoring of the DL preemption indication information is performed. The UE may compare an time-domain scheduling interval allocated to itself with the threshold time-domain scheduling interval information in order to determine whether to perform the monitoring. For example, when a time-domain scheduling interval exceeding a threshold time-domain scheduling interval is allocated, the eMBB UE may determine that it is necessary to monitor the DL preemption indication information. On the other hand, when a time-domain scheduling interval less than a threshold time-domain scheduling interval is allocated, URLLC UE may determine that it is unnecessary to monitor the DL preemption indication information.

Further the monitoring configuration information may include information on whether to indicate a notification for a resource on which DL preemption occurs before the DL preemption or after the DL preemption when the dynamic multiplexing mode is applied. That is, this is information for determining when puncturing information for resources which are preempted for URLLC traffic will be notified to the UE, in other words, referred to as a puncturing notification mechanism.

In addition, the base station may transmit the monitoring configuration information to the UE at step S410.

Such monitoring configuration information may be indicated to the UE through cell-specific or UE-specific RRC signaling. At this time, even when the UE receives the monitoring configuration information through the cell-specific RRC signaling, corresponding monitoring operation of the UE may differ depending on capabilities of the UE.

Further, in case DL preemption occurs, the base station may transmit the DL preemption indication information to the UE at step S420.

The DL preemption indication information may be indicated through group-common DCI. The group-common DCI may be transmitted to the UE through a DL control channel (PDCCH). Further, group-common DCI indicating slot format related information (SFI) and group-common DCI indicating the DL preemption indication information are separated from each other and then transmitted individually.

The DL preemption indication information may be indicated to the UE before DL preemption occurs. This scenario may be referred to as a pre-notification. In this case, the UE monitors DL preemption indication information while DL data is received.

The DL preemption indication information may be indicated to the UE after DL preemption has occurred. This scenario may be referred to as a post-notification. In this case, the UE does not monitor DL preemption indication information while DL data is received.

Hereinafter, in accordance with embodiment of the present disclosure, methods of a UE and a base station are provided for transmitting/receiving DL preemption indication information will be discussed in detail.

Some embodiments described below may be configured individually or in any combination.

As described above, in order to support the URLLC service in the NR, it is necessary to support a short scheduling unit (or, TTI (transmission time interval)) for satisfying requirements related to latency in time domain. On the other hand, in case of the eMBB service or the mMTC service, in defining a scheduling unit in the time domain, it may be more effective to use a longer time-domain resource allocation unit compared with the usage scenario of the URLLC in terms of control overhead and coverage.

Thus, as methods for simultaneously satisfying various NR usage scenarios, it is necessary to support a mixed numerology structure for supporting, through one NR carrier, both a numerology of subcarrier spacing (e.g., larger subcarrier spacing, such as 60 kHz, 120 kHz, etc.) that is easy to define a short time-domain resource allocation unit suitable for the URLLC and a numerology of subcarrier spacing (e.g., 15 kHz for eMBB or 3.75 kHz for mMTC) suitable for the eMBB and the mMTC, or it is necessary to support simultaneously time-domain scheduling units with lengths each different from another, such as a subframe, a slot, or a mini-slot in an NR carrier operated with arbitrary one numerology.

For one example, a time/frequency resource (or region) allocated based on an optimal scheduling unit for each usage scenario may be allocated semi-statically. According to each usage scenario for each UE, resource allocation may be performed using a time/frequency resource of a corresponding region.

However, when a region for each usage scenario is divided by such a semi-static method, efficiency may be reduced from an NR system perspective. For example, if a time/frequency resource supporting a short time-domain scheduling unit is allocated always exclusively for the URLLC service in an NR cell where URLLC traffic occurs rarely, control overhead significantly increases in most situations where eMBB/mMTC traffic occurs.

Accordingly, to address this issue, a scheduling method is required to satisfy a latency requirement of the URLLC by dynamically using a part of scheduling resources of the eMBB or the mMTC whenever URLLC traffic occurs.

To this end, in the NR, through the puncturing of one or more OFDM symbols of resources allocated for a data channel of an eMBB or a mMTC, an eMBB/URLLC multiplexing method based on dynamic puncturing may be considered using for urgent URLLC data transmission/reception. That is, in URLLC data transmission/reception, a method may be considered for supporting preemption-based scheduling.

Specifically, in case dynamic puncturing based multiplexing is applied between the eMBB and the URLLC, a pre-notification method for indicating corresponding information before the puncturing and a post-notification method for indicating the corresponding puncturing after corresponding on-going transmission has been completed may be considered, as a method for indicating a notification to an corresponding eMBB UE for a resource on which the puncturing is performed for URLLC data transmission.

In accordance with embodiments of the present disclosure, a method is provided for configuring eMBB/URLLC multiplexing modes for effectively using such various eMBB/URLLC multiplexing methods.

In addition, in the present disclosure, a radio channel or a signal for indicating, to an eMBB UE, information on a punctured time/frequency radio resource to be used for urgent URLLC data transmission among resources allocated for eMBB data transmission/reception (e.g., a PDSCH or a PUSCH transmission/reception) may be referred to as a dynamic puncturing indication signal/channel, a puncturing notification signal/channel or a preemption indication signal/channel, etc. All of these terms may have the same meaning and examples of possible definitions. Embodiments of the present disclosure are not limited thereto.

Embodiment 1: eMBB/URLLC multiplexing Mode Configuration

An NR cell/base station may configure a multiplexing mode between eMBB traffic and URLLC traffic in the cell and may transmit the result of the configuration to UEs in the cell through cell-specific or UE-specific higher layer signaling, such as an RRC.

Configuration information on the multiplexing mode denotes an information region for indicating configuration information on a multiplexing scheme between a DL eMBB downlink transmission resource and a DL URLLC data transmission resource supported by the cell. The NR cell/base station may configure one of the semi-static multiplexing and the dynamic multiplexing and indicate the result of the configuration to the UE(s). For another example, the multiplexing mode configuration information may include information on whether dynamic multiplexing is supported (in a true vs. false manner) based on the dynamic puncturing for eMBB data resources, described above, in the cell.

Thus, in case the dynamic multiplexing mode is configured, for urgent URLLC traffic transmission, one or more resources are punctured among DL data channel resources for all eMBB UEs (configured in a cell-specific manner) in the cell or a specific eMBB UE (UE-specific or cell-specific with UE capability based configuration: it is configured by cell-specific signaling, but whether or not it is applied to each UE is determined depending on capabilities of the corresponding UE). The eMMB UE performs monitoring operation for DL notification information (or a corresponding notification channel) on whether the puncturing is performed or a preemption indication signal/channel.

Differentiation between a UE (e.g., the eMBB UE) that monitors notification information (or channel) or a preemption indication signal/channel for the dynamic puncturing and a UE (e.g., the URLLC UE) that is not needed to monitor may be determined by a subcarrier spacing (SCS) value set for the corresponding UE and a time-domain scheduling unit (e.g. a slot, an aggregated slot, a mini-slot, etc.) allocated for the corresponding UE.

For another example, for differentiating between the eMBB and the URLLC, it is possible to define a threshold (e.g., X ms) value of a time-domain scheduling unit (or interval), that is, a threshold time-domain scheduling interval, and it is possible to define only a UE having a time-domain scheduling unit larger than the threshold time-domain scheduling interval to monitor notification information (or channel) or a preemption indication signal/channel for the dynamic puncturing.

For another example, as described above, the eMBB multiplexing mode or/and the URLLC multiplexing mode may be configured for each UE through UE-specific RRC signaling. Thus, for urgent URLLC traffic transmission, puncturing may be performed for one or more resources of DL data channel resources for a UE configured with the dynamic multiplexing mode. The corresponding UE monitors DL notification information (or a corresponding notification channel) on whether the puncturing is performed or a preemption indication signal/channel. That is, whether monitoring is performed for the puncturing notification signal/channel or the preemption indication signal/channel may be configured for each UE through UE-specific RRC signaling.

Embodiment 2: Notification Mechanism Configuration for Dynamic Multiplexing

In case the dynamic multiplexing mode based on dynamic puncturing is configured, an NR cell/base station may configure additionally a puncturing notification mechanism and transmit the configured result to UEs in a corresponding cell through cell-specific or UE-specific higher layer signaling, such as an RRC signaling.

Specifically, corresponding puncturing notification mechanism configuration information may belong to an information region for indicating the pre-notification or post-notification, when a dynamic multiplexing method based on the dynamic puncturing is applied In case the pre-notification scheme is applied, a corresponding UE (ex. eMBB UE) may perform the monitoring of puncturing notification information (or channel) or a preemption indication signal/channel, while DL data is received for the UE.

On the other hand, in case the post-notification scheme is applied, a corresponding UE may not be allowed to perform the monitoring of puncturing notification information (or channel) or a preemption indication signal/channel, during the reception of DL data channel.

Figure 2:
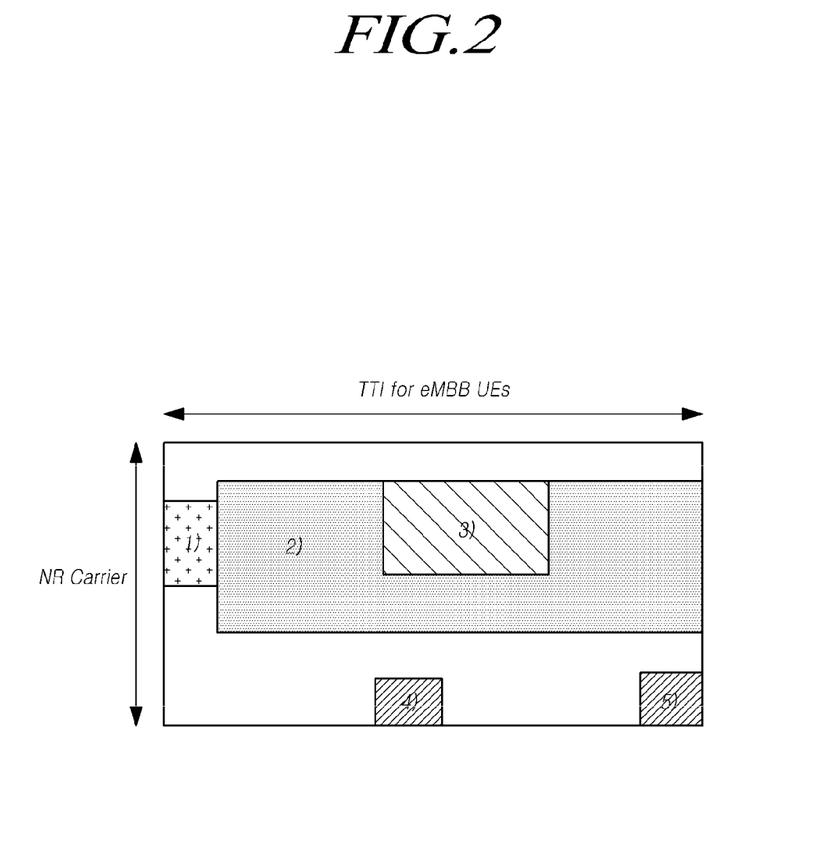
FIG. 2 is a diagram illustrating a method for transmitting downlink preemption indication information to a user equipment through a pre-notification method or a post-notification method, according to embodiments of the present disclosure.

FIG. 2 is a diagram illustrating a method for transmitting DL preemption indication information to a UE through a pre-notification scheme or a post-notification scheme, according to embodiments of the present disclosure.

Referring to FIG. 2, the horizontal axis represents a TTI for eMBB UEs as a time domain resource, and the vertical axis represents an NR carrier as a frequency domain resource.

Among regions as shown in FIG. 2, the 1) region is a region for transmitting a DL control channel (PDCCH) for an eMMB UE, and the DL control channel includes scheduling information on a DL data channel (PDSCH) for the eMBB UE.

The 2) region represents a region for transmitting the DL data channel to the eMBB UE.

The 3) region represents a region for enabling a URLLC UE to transmit a DL control channel (PDCCH) or DL data channel (PDSCH) through a preempted resource, when DL preemption occurs. In this case, the eMBB UE is required to monitor information that the corresponding resource has been preempted by the URLLC UE, that is, DL preemption indication information, to recognize the occurrence of the DL preemption and to respond thereto.

At this time, in case the pre-notification scheme is used, DL preemption indication information corresponding to the 4) region is transmitted to the eMBB UE, before the preemption occurs.

On the other hand, in case the post-notification scheme is used, DL preemption indication information corresponding to the 5) region is transmitted to the eMBB UE, after the preemption has occurred.

Additionally, multiplexing mode configuration information of the Embodiment 1 and notification mechanism configuration information of the Embodiment 2 may be transmitted through separate information regions based on separate coding, or configured through one information region (e.g. '00': semi-static multiplexing, '01': dynamic multiplexing with pre-notification, '10': dynamic multiplexing with post-notification) based on joint coding.

Figure 5:
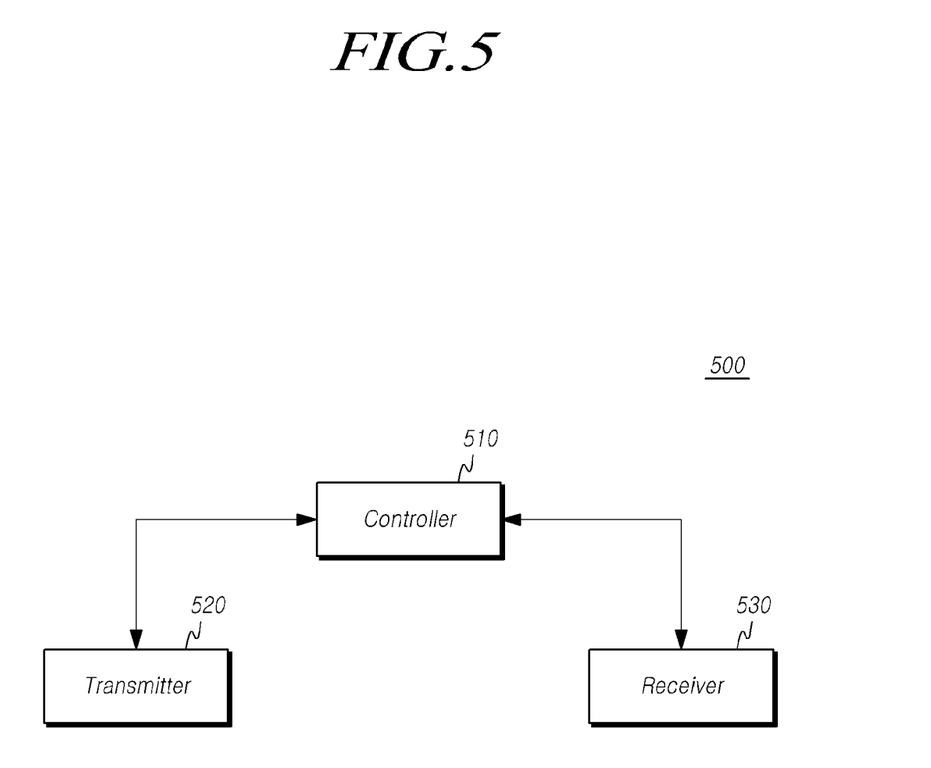
FIG. 5 is a block diagram illustrating a base station according to embodiments of the present disclosure.

FIG. 5 is a block diagram illustrating a base station according to embodiments of the present disclosure.

Referring to FIG. 5, a base station 500 includes a controller 510, a transmitter 520, and a receiver 530.

The controller 510 may configure or generate monitoring configuration information on DL preemption indication information.

At this time, as described above, the monitoring configuration information may include information on whether to monitor the DL preemption indication information.

That is, the monitoring configuration information may include information on whether or not a UE will monitor the DL preemption indication information used for indicating whether DL is preempted. For example, an eMBB UE needs to monitor the DL preemption indication information since a resource originally allocated to itself may be preempted by an URLLC UE. However, the URLLC UE does not need to monitor the DL preemption indication information since there is no possibility that a resource originally allocated to itself is preempted by another UE.

The monitoring configuration information may include information on a multiplexing mode. The multiplexing mode includes a semi-static multiplexing mode for semi-statically allocating time/frequency resources (or areas) for each of the eMBB service, the URLLC service and the mMTC service, and a dynamic multiplexing mode for dynamically puncturing and using resources for receiving urgent data by the URLLC. The monitoring configuration information may include information for indicating which of the semi-static multiplexing mode and the dynamic multiplexing mode is used. For another example, the monitoring configuration information may include information for representing whether the dynamic multiplexing mode is supported.

Further, the monitoring configuration information may include threshold time-domain scheduling interval information for determining whether the monitoring of the DL preemption indication information is performed. The UE may determine whether to perform the monitoring by comparing an time-domain scheduling interval allocated to itself with the threshold time-span scheduling interval information. For example, in case a time-domain scheduling interval exceeding a threshold time-domain scheduling interval is allocated, the eMBB UE may determine that it is necessary to monitor the DL preemption indication information. On the other hand, in case a time-domain scheduling interval less than a threshold time-domain scheduling interval is allocated, URLLC UE may determine that it is unnecessary to monitor the DL preemption indication information.

Further the monitoring configuration information may include information on whether a notification for a resource on which DL preemption occurs is indicated before the DL preemption or after the DL preemption when the dynamic multiplexing mode is applied. That is, this is information for determining when puncturing information for resources which are preempted for URLLC traffic will be indicated to the UE, in other words, referred to as a puncturing notification mechanism.

Such monitoring configuration information may be indicated to the UE through cell-specific or UE-specific RRC signaling.

The transmitter 520 and the receiver 530 respectively are configured to transmit and receive signals, messages, and data necessary for carrying out some embodiments as described above, to and from a UE.

The transmitter 520 may transmit the monitoring configuration information to the UE. In case DL preemption occurs, the transmitter 520 may transmit the DL preemption indication information to the UE.

The DL preemption indication information may be indicated through group-common DCI. The group-common DCI may be transmitted to the UE through a DL control channel (PDCCH). Further, group-common DCI indicating slot format related information (SFI) and group-common DCI indicating the DL preemption indication information are separated from each other.

The DL preemption indication information may be indicated to the UE before DL preemption occurs. This scenario may be referred to as a pre-notification. In this case, the UE monitors DL preemption indication information while DL data is received.

The DL preemption indication information may be indicated to the UE after DL preemption has occurred. This scenario may be referred to as a post-notification. In this case, the UE does not monitor DL preemption indication information while DL data is received.

Figure 6:
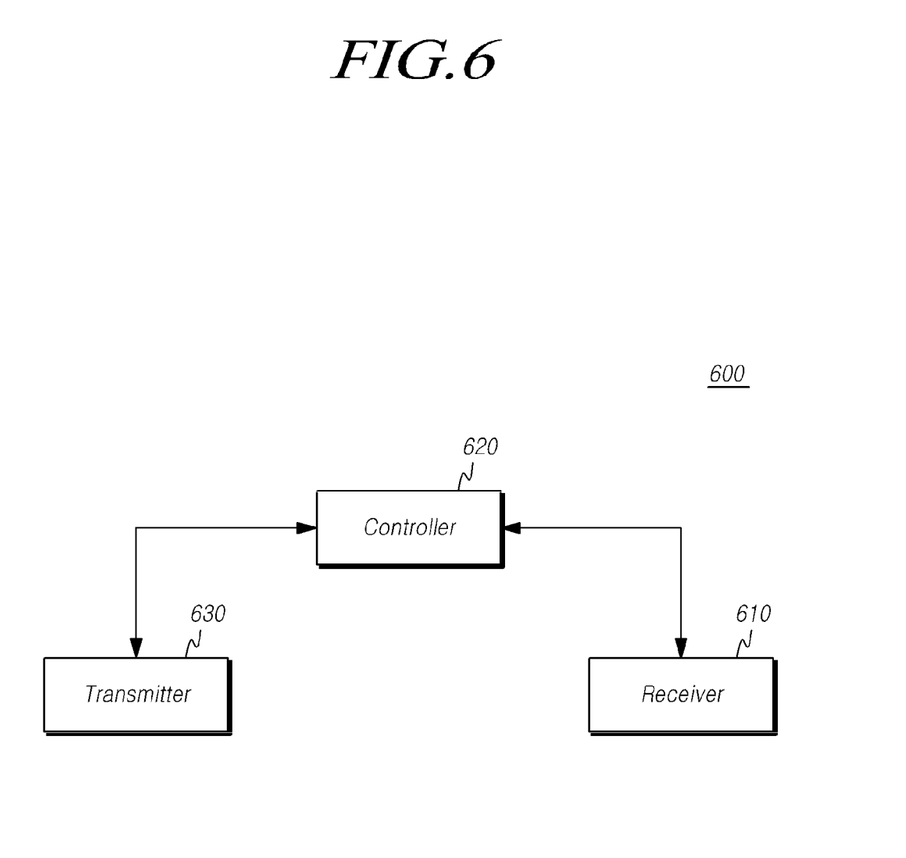
FIG. 6 is a block diagram illustrating a user equipment according to embodiments of the present disclosure.

FIG. 6 is a block diagram illustrating a UE according to embodiments of the present disclosure.

Referring to FIG. 6, the UE 600 includes a receiver 610, a controller 620, and a transmitter 630.

The receiver 610 is configured to receive DL control information and data, messages through a corresponding channel from a base station. The receiver 610 may receive monitoring configuration information on DL preemption indication information from the base station.

At this time, as described above, the monitoring configuration information may include information on whether to monitor the DL preemption indication information.

That is, the monitoring configuration information may include information as to whether or not the UE will monitor the DL preemption indication information used for indicating whether DL is preempted. For example, an eMBB UE needs to monitor the DL preemption indication information since a resource originally allocated to itself may be preempted by an URLLC UE. However, the URLLC UE does not need to monitor the DL preemption indication information since there is no possibility that a resource originally allocated to itself is preempted by another UE.

The monitoring configuration information may include information on a multiplexing mode. The multiplexing mode includes a semi-static multiplexing mode for semi-statically allocating time/frequency resources (or areas) for each of the eMBB service, the URLLC service and the mMTC service, and a dynamic multiplexing mode for dynamically puncturing and using resources for receiving urgent data by the URLLC. The monitoring configuration information may include information for indicating which of the semi-static multiplexing mode and the dynamic multiplexing mode is used. For another example, the monitoring configuration information may include information for representing whether the dynamic multiplexing mode is supported.

Further, the monitoring configuration information may include threshold time-domain scheduling interval information for determining whether the monitoring of the DL preemption indication information is performed. The UE may determine whether to perform the monitoring by comparing an time-domain scheduling interval allocated to itself with the threshold time-span scheduling interval information. For example, in case a time-domain scheduling interval exceeding a threshold time-domain scheduling interval is allocated, the eMBB UE may determine that it is necessary to monitor the DL preemption indication information. On the other hand, in case a time-domain scheduling interval less than a threshold time-domain scheduling interval is allocated, URLLC UE may determine that it is unnecessary to monitor the DL preemption indication information.

Further the monitoring configuration information may include information as to whether a notification for a resource on which DL preemption occurs is indicated before the DL preemption or after the DL preemption when the dynamic multiplexing mode is applied. That is, this is information for determining when puncturing information for resources which are preempted for URLLC traffic will be notified to the UE, in other words, referred to as a puncturing notification mechanism.

Such monitoring configuration information may be indicated to the UE through cell-specific or UE-specific RRC signaling.

The controller 620 may monitor the DL preemption indication information based on the received monitoring configuration information.

The DL preemption indication information may be indicated through group-common DCI. The group-common DCI may be transmitted to the UE through a DL control channel (PDCCH). Further, group-common DCI indicating slot format related information (SFI) and group-common DCI indicating the DL preemption indication information are separated from each other.

The DL preemption indication information may be indicated to the UE before DL is preempted. This scenario may be referred to as a pre-notification. In this case, the UE monitors DL preemption indication information while DL data is received.

The DL preemption indication information may be indicated to the UE after DL is preempted. This scenario may be referred to as a post-notification. In this case, the UE does not monitor DL preemption indication information while DL data is received.

The transmitter 630 is configured to transmit UL control information and data, messages through a corresponding channel to the base station.

The standardized specifications or standard documents related to the embodiments described above have been omitted in order to simplify the description but constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

The invention claimed is:

1. A method of a user equipment (UE) for receiving downlink (DL) preemption indication information, the method comprising:
   receiving monitoring configuration information on the DL preemption indication information from a base station; and
   monitoring the DL preemption indication information based on the monitoring configuration information,
   wherein the monitoring configuration information includes information on whether to monitor the DL preemption indication information, and wherein the DL preemption indication information is indicated through group-common DL control information (DCI), and the group-common DCI is received through a resource after the preempted resource indicated by the DL preemption indication information.

2. The method according to claim 1, wherein the monitoring configuration information is indicated through UE-specific radio resource control (RRC) signaling.

3. The method according to claim 1, wherein the monitoring configuration information includes threshold time-domain scheduling interval information for determining whether the monitor the DL preemption indication information.

4. A method of a base station for transmitting downlink (DL) preemption indication information, the method comprising:
    configuring monitoring configuration information on the DL preemption indication information;
    transmitting the monitoring configuration information to a user equipment (UE); and
    when DL is preempted, transmitting the DL preemption indication information to the user equipment,
    wherein the monitoring configuration information includes information on whether to monitor the DL preemption indication information and
    wherein the DL preemption indication information is indicated through group-common DL control information (DCI), and the group-common DCI is received through a resource after the preempted resource indicated by the DL preemption indication information.

5. The method according to claim 4, wherein the monitoring configuration information is transmitted to the user equipment through UE-specific radio resource control (RRC) signaling.

6. The method according to claim 4, wherein the monitoring configuration information includes threshold time-domain scheduling interval information for determining whether to monitor the DL preemption indication information.

7. A user equipment (UE) receiving downlink (DL) preemption indication information, the user equipment comprising:
    a receiver receiving monitoring configuration information on the DL preemption indication information from a base station; and
    a controller monitoring the DL preemption indication information based on the monitoring configuration information,
    wherein the monitoring configuration information includes information on whether to monitor the DL preemption indication information, and
    wherein the DL preemption indication information is indicated through group-common DL control information (DCI), and the group-common DCI is received through a resource after the preempted resource indicated by the DL preemption indication information.

8. The user equipment according to claim 7, wherein the monitoring configuration information is indicated through UE-specific radio resource control (RRC) signaling.

9. The user equipment according to claim 7, wherein the monitoring configuration information includes threshold time-domain scheduling interval information for determining whether to monitor the DL preemption indication information.

* * * * *